US012650623B2

(12) United States Patent
Lee et al.

(10) Patent No.: US 12,650,623 B2
(45) Date of Patent: Jun. 9, 2026

(54) BACKLIGHT UNIT AND DISPLAY DEVICE

(71) Applicant: LG ELECTRONICS INC., Seoul (KR)

(72) Inventors: Uihyung Lee, Seoul (KR); Jungnam An, Seoul (KR); Soowang Seong, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 19/072,008

(22) Filed: Mar. 6, 2025

(65) Prior Publication Data

US 2026/0036847 A1 Feb. 5, 2026

(30) Foreign Application Priority Data

Aug. 2, 2024 (KR) ......................... 10-2024-0103393
Oct. 14, 2024 (WO) ............... PCT/KR2024/015496

(51) Int. Cl.
G02F 1/1335 (2006.01)
(52) U.S. Cl.
CPC .............................. G02F 1/133607 (2021.01)
(58) Field of Classification Search
CPC ..................... G02F 1/133607; G02F 1/133606
See application file for complete search history.

(56) References Cited

U.S. PATENT DOCUMENTS

2010/0271840 A1 * 10/2010 Hamada ............... G02B 5/0247
                                                              362/609
2024/0210755 A1 * 6/2024 Yang .................. G02F 1/133607

FOREIGN PATENT DOCUMENTS

| JP | 2009-025774 | 2/2009 |
| JP | 2009-069404 | 4/2009 |
| JP | 2011-150078 | 8/2011 |
| KR | 10-2008-0002134 | 1/2008 |
| KR | 10-2011-0075232 | 7/2011 |

OTHER PUBLICATIONS

PCT International Application No. PCT/KR2024/015496, Written Opinion and International Search Report dated Apr. 18, 2025, 9 pages.

* cited by examiner

*Primary Examiner* — Sean P Gramling
(74) *Attorney, Agent, or Firm* — LEE, HONG, DEGERMAN, KANG & WAIMEY

(57) ABSTRACT

Provided is a backlight unit including a light assembly, a diffusion plate that emits incident light of the light assembly forward, and an optical sheet positioned on a front surface of the diffusion plate, wherein the diffusion plate includes a plurality of prism irregularities formed on the front surface thereof, and a plurality of bubbles positioned inside the diffusion plate.

9 Claims, 8 Drawing Sheets

FIG. 8

| No | Prism shape | Prism pattern | Prism pitch | Prism height |
|---|---|---|---|---|
| Prism sheet | | | 60um | 30um |
| Prism D/P | | | 196um | 87um |

BACKLIGHT UNIT AND DISPLAY DEVICE

CROSS-REFERENCE TO RELATED APPLICATIONS

Pursuant to 35 U.S.C. § 119, this application claims the benefit of earlier filing date and right of priority to Korean Patent Application No. 10-2024-0103393 filed on Aug. 2, 2024, and International Application No. PCT/KR2024/015496, filed on Oct. 14, 2024, the contents of which are all hereby incorporated by reference herein in their entireties.

BACKGROUND

Field

The present disclosure relates to a backlight unit having a simplified layered structure and a display device including the same.

Discussion of the Related Art

With growth of information society, demand for various display devices has increased. In order to satisfy such demand, in recent years, a liquid crystal display (LCD), a field emission display (FED), a plasma display panel (PDP), and an electroluminescent device have been developed as display devices.

A liquid crystal panel of the liquid crystal display includes a liquid crystal layer and a TFT substrate and a color filter substrate opposite each other in the state in which the liquid crystal layer is interposed therebetween, wherein a picture is displayed using light provided from a backlight unit.

An active matrix type organic light-emitting display has come onto the market as an example of the electroluminescent device. Since the organic light-emitting display is self-emissive, the organic light-emitting display has no backlight, compared to the liquid crystal display, and has merits in terms of response time and viewing angle, and therefore the organic light-emitting display has attracted attention as a next-generation display.

However, a high-performance, high-definition OLED TV is not competitive in price, so that technology development is also underway to similarly secure advantages of the OLED with the LCD. The liquid crystal display renders colors using light provided by the backlight unit, and the backlight unit transmits light to a liquid crystal panel using a plurality of optical sheets with various irregularity shapes.

However, when the plurality of optical sheets are used, optical interference occurs and a manufacturing cost increases depending on the number of sheets, so that research is being conducted on a method for transmitting light more effectively to the liquid crystal panel while reducing the number of members.

SUMMARY

The present disclosure is to provide a backlight unit with a reduced number of optical sheets and a display device including the same.

Provided is a backlight unit including a light assembly, a diffusion plate that emits incident light of the light assembly forward, and an optical sheet positioned on a front surface of the diffusion plate, wherein the diffusion plate includes a plurality of prism irregularities formed on the front surface thereof, and a plurality of bubbles positioned inside the diffusion plate.

The bubbles may have a size in a horizontal direction greater than a size in a thickness direction.

The size in the horizontal direction of the bubbles may be at least four times the size in the thickness direction.

A size in a horizontal direction of the bubbles may be greater than a pitch of the prism irregularities.

A pitch of the prism irregularities may be equal to or greater than 150 um.

A height of the prism irregularities may be equal to or greater than 50 um and equal to or smaller than 200 um.

The backlight unit may further include rear surface irregularity patterns positioned on a rear surface of the diffusion plate, and the rear surface irregularity patterns may include wedge-shaped grooves.

The diffusion plate may include a scattering agent in a portion excluding the prism irregularities.

The optical sheet may include a single prism sheet or a single micro lens sheet.

The optical sheet may include a diffuser sheet positioned on a front surface of the single prism sheet or the single micro lens sheet.

According to another aspect of the present disclosure, provided is a display device including a liquid crystal panel, and a backlight unit that supplies light from a rear surface of the liquid crystal panel, wherein the backlight unit includes a light assembly, a diffusion plate that emits incident light of the light assembly forward, and an optical sheet positioned on a front surface of the diffusion plate, wherein the diffusion plate includes a plurality of prism irregularities formed on the front surface thereof, and a plurality of bubbles positioned inside the diffusion plate.

The backlight unit of the present disclosure has an effect of increasing the brightness via the light guide plate with the prism added.

In addition, by reducing the number of prism sheets, the thickness of the backlight unit may be reduced and price competitiveness may be secured.

In addition, a failure rate of the backlight unit caused by the optical sheet may be reduced by reducing the application of the prism sheet.

The effects obtained by the present disclosure are not limited to the above-mentioned effects, and other effects not mentioned will be clearly understood by those skilled in the art to which the present disclosure pertains from the following description.

BRIEF DESCRIPTION OF THE DRAWINGS

The accompanying drawings, which are included to provide a further understanding of the disclosure and are incorporated in and constitute a part of the present application, illustrate embodiment(s) of the disclosure and together with the description serve to explain the principle of the disclosure. The above and other aspects, features, and advantages of the present disclosure will become more apparent upon consideration of the following description of preferred embodiments, taken in conjunction with the accompanying drawing figures. In the drawings:

FIGS. 5 to 8 are cross-sectional views illustrating various embodiments of a backlight unit of the present disclosure.

DESCRIPTION OF SPECIFIC EMBODIMENTS

Figure 1:
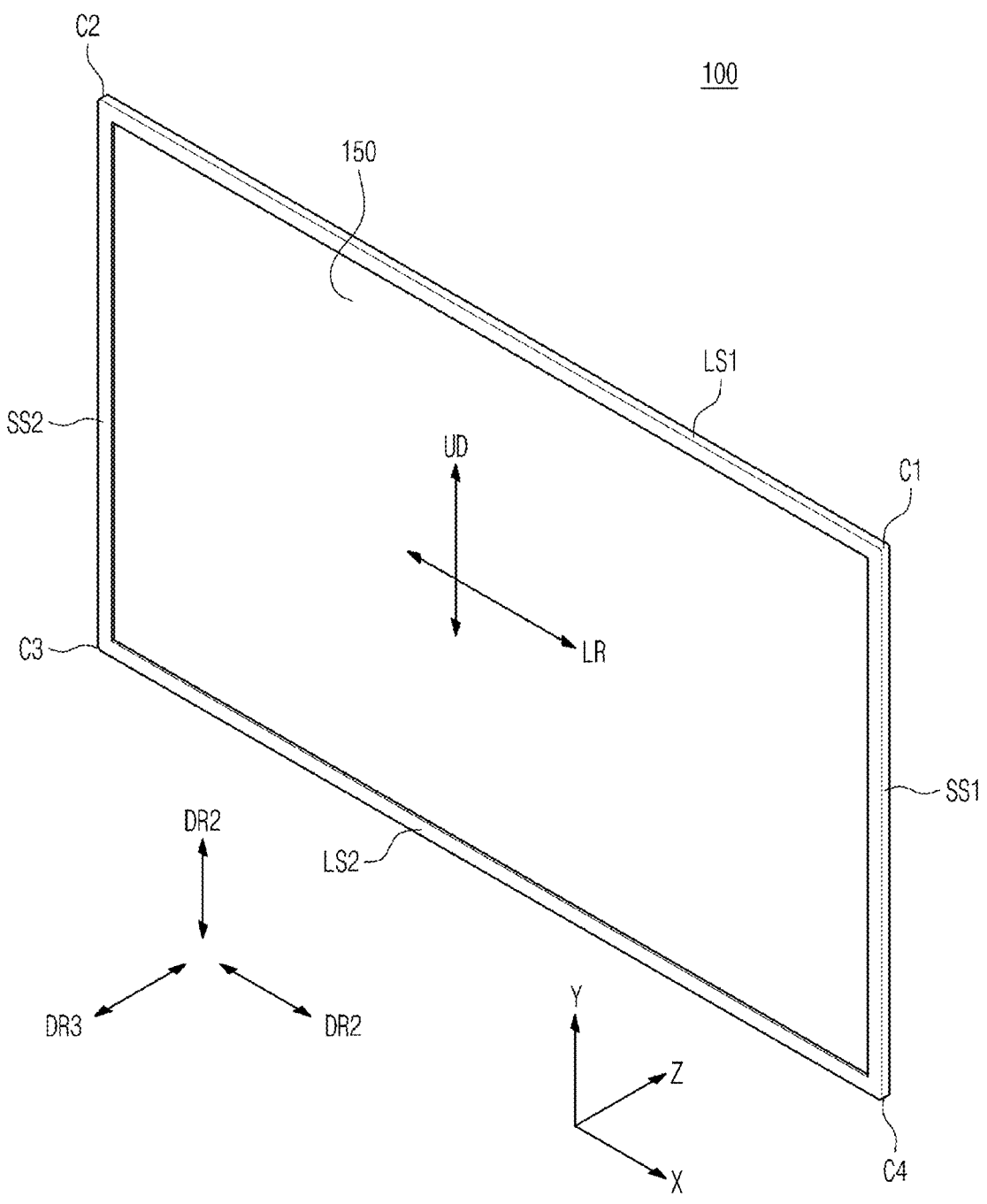
FIG. 1 is a perspective diagram illustrating an example of a display device of the present disclosure.

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be directly connected with the other element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

Meanwhile, an image display device described in this specification is, for example, an intelligent image display device having a computer supporting function in addition to a broadcast reception function, wherein an Internet function may be added while the broadcast reception function is devotedly performed, whereby an interface that is more conveniently used, such as a handwriting type input device, a touchscreen, or a space remote control, may be provided. In addition, the image display device may be connected to the Internet or a computer through support of a wired or wireless Internet function, whereby various functions, such as e-mail, web browsing, banking, or gaming, may be executed. For such various functions, a standardized general-purpose OS may be used.

In the image display device described in the present disclosure, therefore, various applications may be freely added or deleted, for example, on a general-purpose OS kernel, whereby various user friendly functions may be executed. More specifically, the image display device may be a network TV, an Hbb TV, or a smart TV, and is applicable to a smartphone depending on circumstances.

FIG. 1 is a front perspective diagram illustrating an example of a display device of the present disclosure. A display device 100 of the present disclosure may have a rectangular main body including a pair of long sides and a pair of short sides. It may include a first long side LS1, a second long side LS2 facing the first long side LS1, a first short side SS1 adjacent to the first long side LS1 and the second long side LS2, and a second short side SS2 facing the first short side SS1.

A long side extending in a horizontal direction and a short side extending in a vertical direction are illustrated in the drawing, but the long side and the short side may have the same length, and the long side may be disposed in the vertical direction.

For convenience of explanation, the following description is made based on an embodiment in which a side extending in the horizontal direction (i.e., x-axis direction) and a side extending in the vertical direction (i.e., y-axis direction) are referred to as a long side and a short side, respectively, but the present disclosure is not limited thereto.

A first direction DR1 may be a direction parallel to the long sides LS1 and LS2 of the display device 100, and a second direction DR2 may be a direction parallel to the short sides SS1 and SS2 of the display device 100. A third direction DR3 may be a direction perpendicular to the first direction DR1 and/or the second direction DR2.

The side of the display device 100 on which a picture is displayed may be referred to as a front side or a front surface. When the display device 100 displays the picture, the side of the display device 100 from which the picture cannot be viewed may be referred to as a rear side or a rear surface.

When viewing the display device 100 from the front side or the front surface, the side of the first long side LS1 may be referred to as an upper side or an upper surface. In the same manner, the side of the second long side LS2 may be referred to as a lower side or a lower surface. In the same manner, the side of the first short side SS1 may be referred to as a right side or a right surface, and the side of the second short side SS2 may be referred to as a left side or a left surface.

The display device may include a display unit 120 configured to output an image. A driving signal may be generated by converting an image signal, a data signal, an OSD signal, a control signal, or the like received from the interface unit, which are processed by the controller 180. The display unit 150 may include a display panel including a plurality of pixels.

Each of the plurality of pixels in the display panel may include RGB subpixels. Alternatively, each of the plurality of pixels in the display panel may include RGBW subpixels. The display module 151 may convert an image signal, a data signal, an OSD signal, and a control signal processed by the controller 180 to generate a driving signal for the plurality of pixels.

The display device 100 includes a display unit 120 that occupies most of a front area and a case that covers a rear side, a lateral side and the like of the display unit 120 and packages the display unit 120.

The display unit 150 may be a Plasma Display Panel (PDP), a Liquid Crystal Display (LCD), an Organic Light Emitting Diode (OLED), a flexible display, or the like, and may also be a 3D display. The 3D display unit 150 may be classified into a glasses-free type or a glasses type.

An LCD display is supplied with light through a backlight unit because it is difficult to emit light by itself. The backlight unit is a device that uniformly supplies light supplied from a light emitting lamp to liquid crystals located on a front surface. As the backlight unit becomes thinner and thinner, a thin LCD can be implemented.

Figure 2:
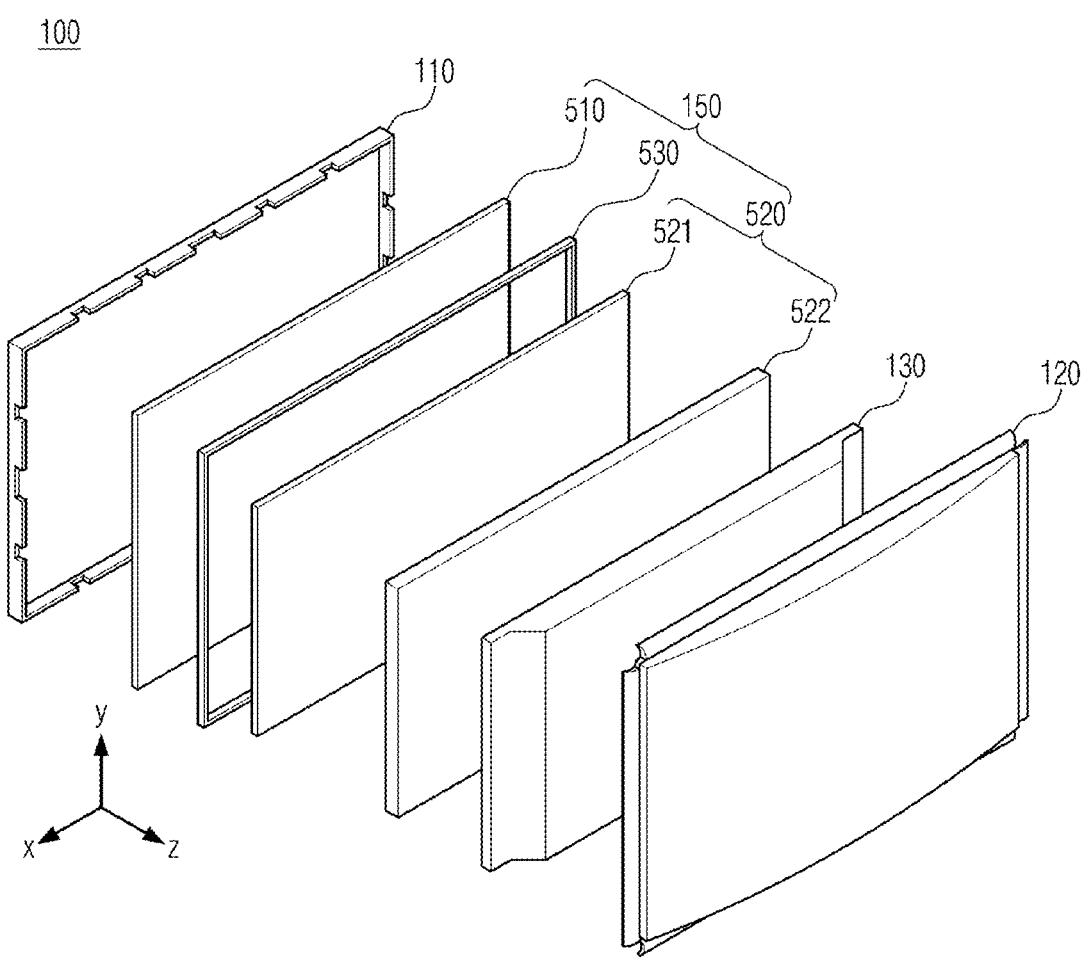
FIG. 2 is an exploded perspective diagram illustrating an example of a display device of the present disclosure.

FIG. 2 is an exploded diagram illustrating a display device of the present disclosure. Referring to FIG. 2, a display unit 120 of the present disclosure is an LCD display including a display panel 510 and a backlight unit 520.

A front cover 110 may cover at least a portion of a front surface and a side surface of the display panel 510. The front cover 110 may be divided into a front cover positioned on a side of the front surface of the display panel 510 and a side cover positioned on a side of the side surface of the display panel 510. The front cover and the side cover may be separately configured. One of the front cover and the side cover may be omitted.

The display panel 510 is provided to a front surface of the display device 100 to display an image. The display panel 510 may display an image by allowing a plurality of pixels to output Red, Green, or Blue (RGB) per pixel according to a timing. The display panel 510 may be divided into an active area in which an image is displayed and a de-active area in which an image is not displayed. The display panel 510 may include a front substrate and a rear substrate facing each other with a liquid crystal layer interposed therebetween.

The front substrate may include a plurality of pixels consisting of Red (R), Green (G), and Blue (B) subpixels. The front substrate may output light corresponding to a color of red, green, or blue according to a control signal.

The rear substrate may include switching elements. The rear substrate may switch pixel electrodes. For example, the pixel electrode may change molecular arrangement of a liquid crystal layer according to a control signal applied from the outside. The liquid crystal layer may include liquid crystal molecules. The liquid crystal molecules may change the arrangement based on a voltage difference generated between a pixel electrode and a common electrode. The liquid crystal layer may transmit the light provided from the backlight unit 520 to the front substrate or block the light.

The backlight unit 520 may be located behind the display panel 510. The backlight unit 520 may include light sources. The backlight unit 520 may be coupled to a front side of a frame 130.

The backlight unit 520 may be driven in a full driving mechanism or a partial driving mechanism such as local dimming or impulsive. The backlight unit 520 may include an optical sheet 521 and an optical layer 522.

A guide panel 530 for aligning the positions of the display panel 510 and the backlight unit 520 may be included. The guide panel 530 has a frame shape having four sides, and the display panel 510 and the backlight unit 520 may be seated on a front surface.

The optical sheet 521 may allow light from a light assembly 524 to be evenly transmitted to the display panel 510. The optical sheet 521 may be composed of layers. For example, the optical sheet 521 may include a prism sheet, a diffusion sheet, and the like.

The optical sheet 521 may include a coupling part. The coupling part may be coupled to the front cover 110, the frame 130, and/or the back cover 120. Alternatively, the coupling part may be coupled to a structure formed/coupled on/to the front cover 110, the frame 130, and/or the back cover 120.

The frame 130 may serve to support components of the display device 100. For example, a configuration such as the backlight unit 520 may be coupled to the frame 130. The frame 130 may be made of a metal material such as an aluminum alloy, etc.

The back cover 120 may be located on or behind a rear surface of the display device 100. The back cover 120 may be coupled to the frame 130 and/or the front cover 110. For example, the back cover 120 may be an injection molding product made of a resin material.

Figure 3:
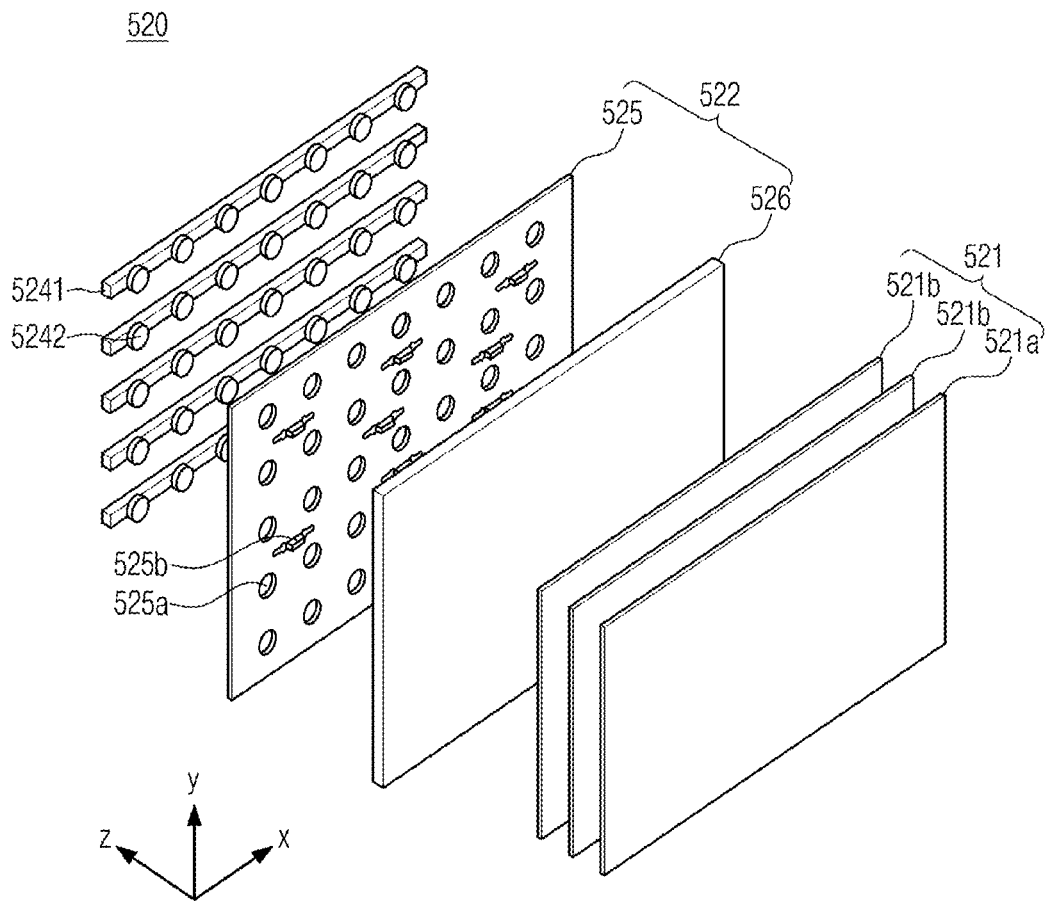
FIG. 3 is a diagram illustrating an embodiment of a backlight unit of a display device.

FIG. 3 is a diagram illustrating an embodiment of the backlight unit 520 of the display device 100.

The backlight unit 520 may include a light assembly 524, an optical layer 522 including a reflective sheet 525 and a diffusion plate 526, and an optical sheet 521 located on a front side of the optical layer 522.

The present embodiment is characterized in that the light assembly 524 is disposed in an array in a rear direction of the display panel 510 as a direct backlight unit 520. The light assembly 524 may include a substrate 5241 and a light emitting lamp 5242 mounted on the substrate 5241.

The substrate 5241 may be configured in the form of a plurality of straps extending in a first direction and spaced apart from each other by a prescribed distance in a second direction orthogonal to the first direction.

At least one light emitting lamp 5242 may be mounted on the substrate 5241. An electrode pattern for connecting an adapter and the light emitting lamp 5242 may be formed on the substrate 5241. For example, a carbon nanotube electrode pattern for connecting the light emitting lamp 5242 and the adapter may be formed on the substrate 5241.

The substrate 5241 may be composed of at least one of polyethylene terephthalate (PET), glass, polycarbonate (PC), and silicon. The substrate 5241 may be a Printed Circuit Board (PCB) on which the at least one light emitting lamp 5242 is mounted.

The light emitting lamp 5242 may be disposed on the substrate 5241 at a prescribed interval in the first direction. A diameter of the light emitting lamp 5242 may be greater than a width of the substrate 5241. That is, it means that the diameter may be greater than the length of the substrate 5241 in the second direction.

The light emitting lamp 5242 may be a light emitting diode (LED) chip or a light emitting diode package including at least one light emitting diode chip.

The light emitting lamp 5242 may be composed of a colored LED or a white LED that emits at least one color among colors such as Red (R), Blue (B), Green (G), and the like. The colored LED may include at least one of a red LED, a blue LED, and a green LED.

The reflective sheet 525 may be located on a front side of the substrate 5241. The reflective sheet 525 may be located on an area other than an area in which the light emitting lamp 5242 of the substrate 5241 is formed. The reflective sheet 525 may include a plurality of through-holes 525a.

The reflective sheet 525 may reflect the light emitted from the light emitting lamp 5242 toward the front side. Also, the reflective sheet 525 may reflect the light reflected from the diffusion plate 526 again.

A diffusion plate supporter 525b that maintains a gap between the light emitting lamp 5242 and the diffusion plate 526 may be further included so that the light of the light emitting lamp 5242 is evenly supplied to a rear surface of the diffusion plate 526.

The reflective sheet 525 may include at least one of a metal and a metal oxide that are reflective materials. For example, the reflective sheet 525 may include a metal and/or a metal oxide having high reflectivity, such as at least one of aluminum (Al), silver (Ag), gold (Au), and titanium dioxide (TiO2).

A resin may be deposited on the light emitting lamp 5242 and/or the reflective sheet 525. The resin may serve to diffuse light emitted from the light emitting lamp 5242. The diffusion plate 526 may diffuse light emitted from the light emitting lamp 5242 upward.

The optical sheet 521 may be positioned in front of the diffusion plate 526. A rear surface of the optical sheet 521 may be in close contact with the diffusion plate 526, and a front surface of the optical sheet 521 may be in close contact with the rear surface of the display panel 510 (refer to FIG. 1).

The optical sheet 521 may include at least one sheet. In detail, the optical sheet 521 may include one or more prism sheets and/or one or more diffusion sheets. A plurality of the sheets included in the optical sheet 521 may be in an adhesive state and/or in a close contact state.

The optical sheet 521 may be composed of a plurality of sheets 521a and 521b having different functions. For example, the plurality of sheets 521a and 521b may be one diffusion sheet 521a and two prism sheets 521b.

The diffusion sheet 521 may prevent the light emitted from the diffusion plate 526 from being partially concentrated, thereby making light distribution more uniform. The prism sheet may condense light emitted from the diffusion sheet 521a and provide the light to the display panel 510.

A coupling part may be formed on at least one of the sides or edges of the optical sheet 521. The coupling part may be formed on at least one of the first to third optical sheets 521a to 521c.

The coupling part may be formed on a long side of the optical sheet 521. The coupling part formed on a first long side and the coupling part formed on a second long side may be asymmetric. For example, it means that the positions and/or number of the coupling parts of the first long side and the coupling part of the second long side may be different from each other.

Figure 4:
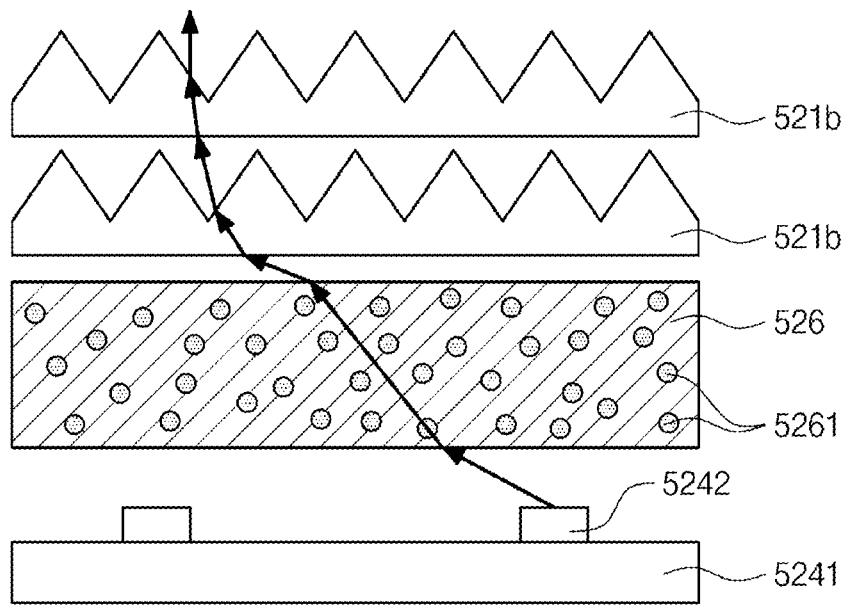
FIG. 4 is a view illustrating an existing backlight unit.

FIG. 4 is a view illustrating the existing backlight unit 520. The existing backlight unit 520 may be composed of the diffusion plate 526 positioned in front of an LED 5242 and the optical sheet 521 positioned on a front surface of the diffusion plate 526.

The diffusion plate 526 may include a scattering agent 5261 that scatters light to transform a point light source of the LED 5242 into a surface light source. The optical sheet 521 may include the prism sheet 521b. Because it is difficult to obtain a sufficient light collecting effect with one sheet, two or more prism sheets 521b are used.

The prism sheet 521b has a predetermined thickness because of prism irregularities 5265, and a thickness of a base film (PET) 5211 for forming the prism irregularities 5265 is also added. Therefore, when using the plurality of prism sheets 521b, there is a problem that a thickness of the backlight unit 520 increases and a cost increases.

FIGS. 5 to 8 are cross-sectional views illustrating various embodiments of the backlight unit 520 of the present disclosure. The backlight unit 520 of the present disclosure forms the prism irregularities 5265 on a front surface of the diffusion plate 526 to replace the existing prism sheet 521b in FIG. 4.

Figure 5:
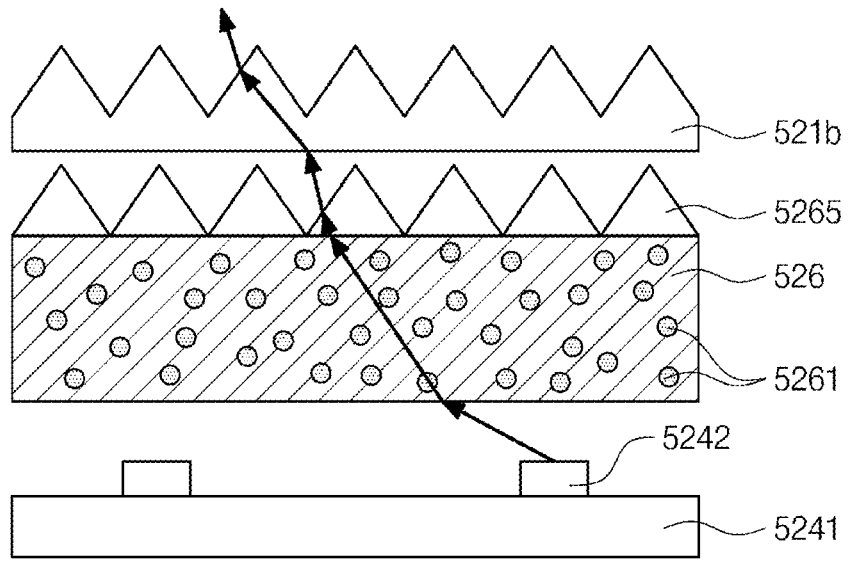

Referring to FIG. 5, the backlight unit 520 of the present disclosure forms the prism irregularities 5265 on the front surface of the diffusion plate 526, thereby reducing the number of prism sheets 521b to one from two.

The present disclosure including the prism irregularities 5265 formed on the diffusion plate 526 instead of on the prism sheet 521b may omit the base film 5211 of the prism sheet 521b and reduce a tolerance resulted from an air gap between the prism sheets 521b, thereby reducing the overall thickness of the backlight unit 520.

The prism irregularities 5265 may have a protrusion having a triangular cross-section like irregularities formed on the prism sheet 521b and may be formed in a shape that includes valleys and mountains by extending. The valley and the mountain may form a straight line or a curved line, and may not necessarily be continuous but may be segmented into a predetermined length. Alternatively, the prism irregularities 5265 may be constructed as quadrangular pyramids forming an array.

The prism irregularities 5265 are attached to the front surface of the diffusion plate 526 to form an integral body therewith, but the prism irregularities 5265 are to collect light diffused from the diffusion plate 526. Therefore, the prism irregularities 5265 do not include the scattering agent 5261 added to the diffusion plate 526. The prism irregularities 5265 may be additionally formed using acrylic resin on the front surface of the diffusion plate 526, or the diffusion plate 526 including the scattering agent 5261 may be manufactured after forming the prism irregularities 5265.

The prism irregularities 5265 may be manufactured using at least one of acrylic, urethane-based, epoxy-based, and melamine-based materials, such as unsaturated polyester, methyl methacrylate, ethyl methacrylate, isobutyl methacrylate, n-butyl methacrylate, n-butyl methyl methacrylate, acrylic acid, methacrylic acid, hydroxyethyl methacrylate, hydroxypropyl methacrylate, hydroxy ethyl acrylate, acrylamide, methylol acrylamide, glycidyl methacrylate, ethyl acrylate, isobutyl acrylate, n-butyl acrylate, and 2-ethyl-hexyl acrylate polymers or copolymers or terpolymers, in addition to the acrylic resin.

The backlight unit 520 with the prism irregularities 5265 formed on a front surface thereof does not have an air layer between the prism irregularities 5265 and the diffusion plate 526, so that a light path thereof has a structure different from that in the existing backlight unit 520. Light supplied to the prism irregularities 5265 without passing through the air layer is not supplied in a vertical direction, but spreads laterally as shown in FIG. 5. Unlike light that has passed through the prism sheet 521b in FIG. 4 is supplied in a forward direction, a great portion of light spreads laterally, and thus brightness of the embodiment in FIG. 5 is only 81% of that of the existing backlight unit 520 in FIG. 4.

Figure 6:
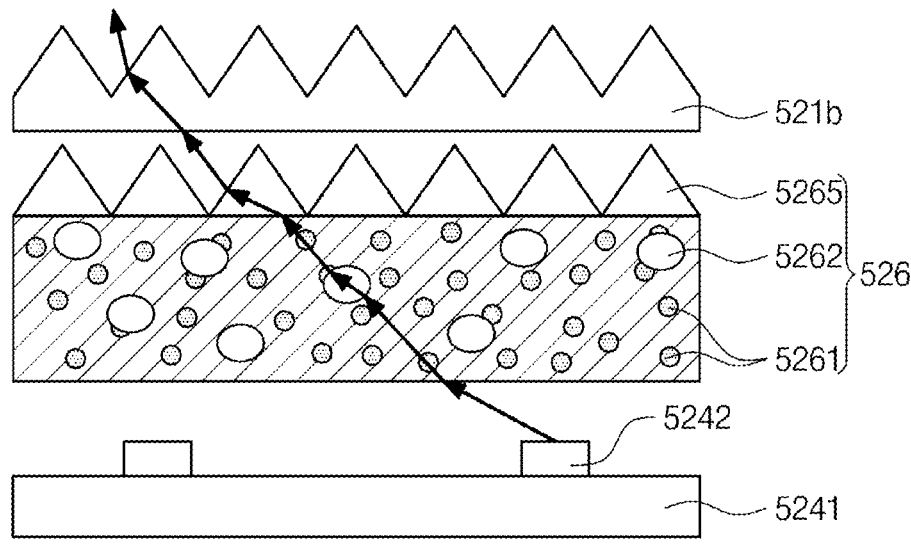

Accordingly, as shown in the embodiment in FIG. 6, bubbles 5262 may be formed in the diffusion plate 526, so that light supplied to the diffusion plate 526 may pass through the air layer. When light passes through the air layer, a light collection efficiency becomes higher than that of the embodiment in FIG. 5, so that brightness may be improved to 87% of that of the existing backlight unit 520.

However, the bubbles 5262 in a spherical shape rather have an effect of scattering light depending on an incident angle of light, so that a light path may be formed in a different manner from that of light passing through existing air layer between the diffusion plate 526 and the prism sheet 521b.

Figure 7:
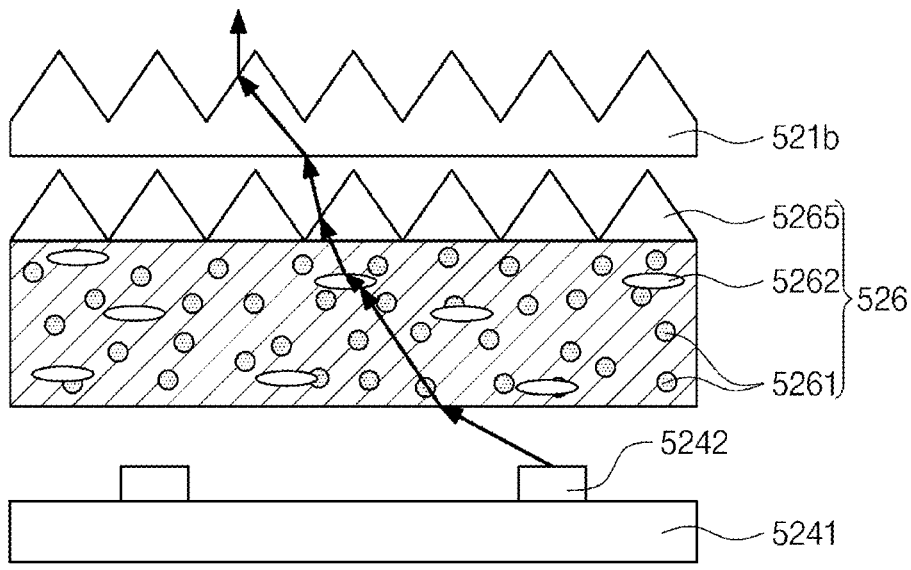

Accordingly, as shown in FIG. 7, the bubbles 5262 included in the diffusion plate 526 may be formed thinly, and the bubbles 5262 having a shape close to a disk shape may be used. With the disk-shaped bubbles 5262 of the diffusion plate 526, an effect similar to that of the existing air layer between the diffusion plate 526 and the prism sheet 521*b* may be obtained.

The bubbles 5262 may be formed by adding a foaming agent when forming the diffusion plate 526 and thermally decomposing the same. In this regard, to form the bubbles 5262 formed in the spherical shape into the disk shape as shown in FIG. 7, the diffusion plate 526 may be stretched horizontally or compressed in a thickness direction to form the bubbles 5262 whose diameter is greater than a thickness.

As shown in FIG. 7, the light path may be almost similar to the embodiment in FIG. 4, and light may be emitted forward, so that the light collection efficiency may be increased, and light efficiency may also be 94% or greater of that of the embodiment in FIG. 4.

FIG. 8 is a table showing a difference between the prism sheet 521*b* and prism irregularities 5212. As a size of the prism irregularities 5265 increases, a light refraction phenomenon increases, so that the light collection efficiency increases. The present disclosure is able to omit the base film 5211 of the prism sheet 521*b*, so that it is effective in increasing the light collection efficiency to implement the prism irregularities 5265 on the front surface of the diffusion plate 526 to have a height of 50 um, which is a size greater than that of the prism irregularities 5212 of the existing prism sheet 521*b*.

However, when the size of the prism irregularities 5265 is great, there is a problem that visibility of the prism irregularities 5265 increases, so that the height of the prism irregularities 5265 may be appropriately 200 µm, and may be equal to or smaller than 100 µm considering the visibility and an increase in the thickness of the backlight unit 520.

A pitch of the prism irregularities 5265 may vary depending on an angle of the prism irregularities 5265, but may be about twice the height or greater. The prism irregularities 5265 of the diffusion plate 526 may be formed to be greater than the prism irregularities 5265 of the prism sheet 521*b*, so that the light collection efficiency may be improved.

Figure 9:
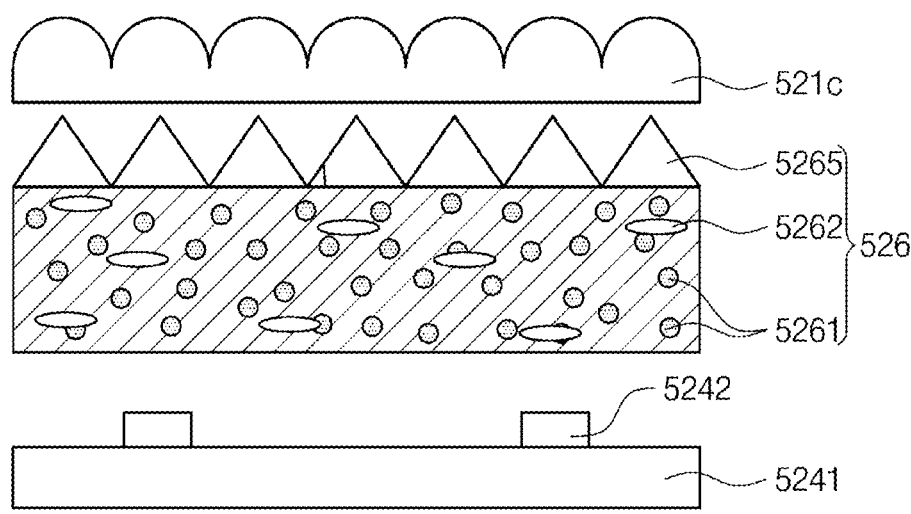
FIGS. 9 to 12 illustrate modified embodiments of the backlight unit 520 in FIG. 7.
Figure 10:
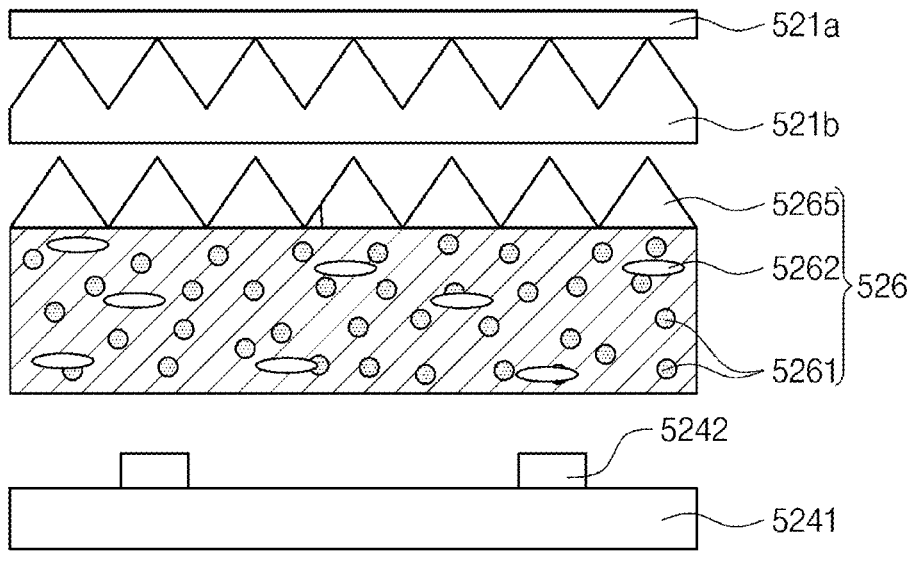

FIGS. 9 to 12 illustrate modified embodiments of the backlight unit 520 in FIG. 7. As illustrated in FIG. 9, instead of the prism sheet 521*b*, a micro lens sheet 521*c* including a plurality of spherical micro lenses may be used. Alternatively, as illustrated in FIG. 10, the diffusion sheet 521*a* may be further included such that light collected via the prism sheet 521*b* forms the surface light source.

Figure 11:
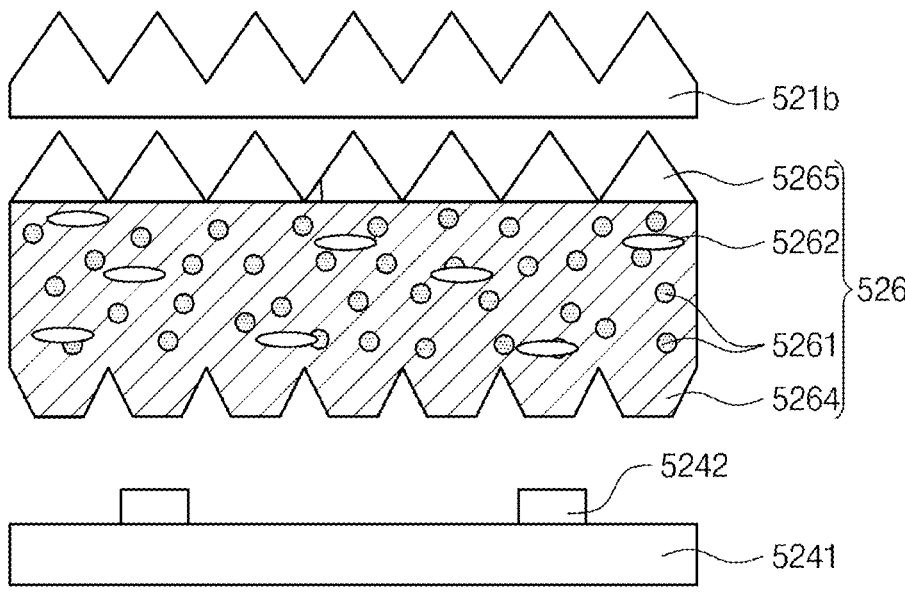

The embodiment illustrated in FIG. 11 forms irregularity patterns 5264 on a rear surface of the diffusion plate 526 to increase the light collection efficiency. The purpose of the diffusion plate 526 is to evenly distribute light supplied from the LED 5242, and the rear surface irregularity patterns 5264 serve to forwardly guide light that spreads too much laterally.

Figure 12:
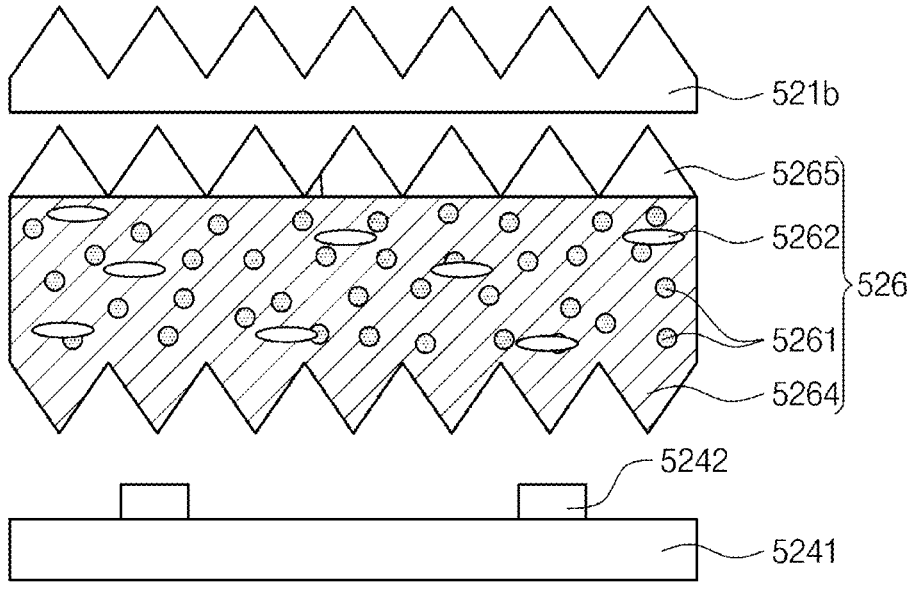

Wedge-shaped grooves may be included as illustrated in FIG. 11, and protruding portions may be flat as illustrated in FIG. 11 or may be formed in a pointed prism shape as illustrated in FIG. 12. The rear surface irregularity patterns 5264 may be made of the same material as the diffusion plate 526, unlike the prism irregularities 5265 located on the front surface of the diffusion plate 526. Accordingly, because the scattering agent 5261 may be included, the diffusion plate 526 may be manufactured using a mold having the rear surface irregularity pattern 5264.

As described above, the backlight unit 520 of the present disclosure has an effect of increasing the brightness via the light guide plate with the prism added.

In addition, by reducing the number of prism sheets 521*b*, the thickness of the backlight unit 520 may be reduced and price competitiveness may be secured.

In addition, a failure rate of the backlight unit 520 caused by the optical sheet 521 may be reduced by reducing the application of the prism sheet 521*b*.

The above embodiments are to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

What is claimed is:

1. A backlight unit comprising:
a light assembly;
a diffusion plate configured to emit incident light of the light assembly forward; and
a single prism sheet positioned on a front surface of the diffusion plate and having a plurality of a first prism irregularities,
wherein the diffusion plate includes:
a plurality of second prism irregularities formed on the front surface thereof; and
a plurality of bubbles positioned inside the diffusion plate,
wherein a size of the second prism irregularities of the diffusion plate are greater than a size of the first prism irregularities of the single prism sheet.

2. The backlight unit of claim 1, wherein a size in the horizontal direction of the bubbles is greater than a size in the thickness direction.

3. The backlight unit of claim 1, wherein a size in the horizontal direction of the bubbles is greater than a pitch of the second prism irregularities.

4. The backlight unit of claim 1, wherein a pitch of the second prism irregularities is equal to or greater than 150 um.

5. The backlight unit of claim 1, wherein a height of the second prism irregularities is equal to or greater than 50 um and equal to or smaller than 200 um.

6. The backlight unit of claim 1, further comprising rear surface irregularity patterns positioned on a rear surface of the diffusion plate, wherein the rear surface irregularity patterns include wedge-shaped grooves.

7. The backlight unit of claim 1, wherein the diffusion plate includes a scattering agent in a portion excluding the second prism irregularities.

8. The backlight unit of claim 1, further comprising a diffuser sheet positioned on a front surface of the single prism sheet.

9. A display device comprising:
a liquid crystal panel; and
a backlight unit configured to supply light from a rear surface of the liquid crystal panel,
wherein the backlight unit includes:
a light assembly;
a diffusion plate configured to emit incident light of the light assembly forward; and
a single prism sheet positioned on a front surface of the diffusion plate and having a plurality of a first prism irregularities,
wherein the diffusion plate includes:
a plurality of second prism irregularities formed on the front surface thereof; and
a plurality of bubbles positioned inside the diffusion plate, wherein a size of the second prism irregularities of the diffusion plate are greater than a size of the first prism irregularities of the single prism sheet.

* * * * *